(12) United States Patent
Follis

(10) Patent No.: US 9,942,396 B2
(45) Date of Patent: Apr. 10, 2018

(54) DOCUMENT DISTRIBUTION AND INTERACTION

(71) Applicant: Adobe Systems Incorporated, San Jose, CA (US)

(72) Inventor: Benjamin D. Follis, Redwood City, CA (US)

(73) Assignee: Adobe Systems Incorporated, San Jose, CA (US)

(*) Notice: Subject to any disclaimer, the term of this patent is extended or adjusted under 35 U.S.C. 154(b) by 22 days.

(21) Appl. No.: 14/069,674

(22) Filed: Nov. 1, 2013

(65) Prior Publication Data

US 2015/0127348 A1 May 7, 2015

(51) Int. Cl.
*H04L 9/32* (2006.01)
*H04L 29/06* (2006.01)
(Continued)

(52) U.S. Cl.
CPC ............ *H04M 3/493* (2013.01); *G06F 21/10* (2013.01); *G06F 21/32* (2013.01); *G06Q 10/103* (2013.01);
(Continued)

(58) Field of Classification Search
CPC .... H04L 9/3281; G06F 21/32; G06F 11/1464; G06F 17/30864; G06F 17/3071; G06F 17/243; G06F 17/24; G05B 23/02; G06Q 50/18; G06Q 20/382; G06Q 21/10; G06Q 20/3674; G06Q 20/10; G06Q 30/018; G06Q 10/10
See application file for complete search history.

(56) References Cited

U.S. PATENT DOCUMENTS 4,621,334 A 11/1986 Garcia
4,805,222 A 2/1989 Young
(Continued)

FOREIGN PATENT DOCUMENTS

WO WO000148986 A1 * 7/2001 .......... H04M 3/5307

OTHER PUBLICATIONS

Craig Le Clair, "What to Look for in E-Signature Providers" (Nov. 15, 2011). Available at https://www.echosign.adobe.com/content/dam/echosign/docs/pdfs/Forrester_What_To_Look_For_In_E-Signature_Providers_Nov_2011.pdf.
(Continued)

*Primary Examiner* — Anne L Thomas-Homescu
(74) *Attorney, Agent, or Firm* — Finch & Maloney PLLC

(57) ABSTRACT

Workflows are provided that enable documents to be distributed, assented to, and otherwise interacted with on an aural and/or oral basis. Such workflows can be implemented so as to allow a recipient to receive, understand, and interact with a document using conventional components such as the microphone and speaker provided by a telephone. For instance, in one embodiment a document originator may send a document to a recipient with a request for an electronic signature. The document may include an audio version of the document terms. The recipient can listen to the audio version of the document terms and record an electronic signature that represents assent to such terms. An electronic signature server can record the recipient's electronic signature and incorporate it into the document, such that it forms part of the electronic document just as a traditional handwritten signature forms part of a signed paper document.

20 Claims, 7 Drawing Sheets

(51) Int. Cl.

| | | |
|---|---|---|
| G06F 11/30 | (2006.01) | |
| G06F 12/14 | (2006.01) | |
| G06F 21/00 | (2013.01) | |
| G06F 11/00 | (2006.01) | |
| G07C 13/00 | (2006.01) | |
| G06Q 40/00 | (2012.01) | |
| G06Q 30/00 | (2012.01) | |
| G06Q 20/00 | (2012.01) | |
| G06Q 50/00 | (2012.01) | |
| G06F 17/00 | (2006.01) | |
| G06F 17/20 | (2006.01) | |
| G06F 17/21 | (2006.01) | |
| G06F 17/22 | (2006.01) | |
| G06F 17/24 | (2006.01) | |
| G06F 17/25 | (2006.01) | |
| G06F 17/26 | (2006.01) | |
| G06F 17/27 | (2006.01) | |
| G06F 17/28 | (2006.01) | |
| G06F 3/00 | (2006.01) | |
| G10L 13/00 | (2006.01) | |
| G10L 13/08 | (2013.01) | |
| G10L 15/00 | (2013.01) | |
| G10L 17/00 | (2013.01) | |
| G10L 21/00 | (2013.01) | |
| G10L 25/00 | (2013.01) | |
| G10L 15/26 | (2006.01) | |
| G06F 7/00 | (2006.01) | |
| G06F 17/30 | (2006.01) | |
| G07F 19/00 | (2006.01) | |
| H04M 15/00 | (2006.01) | |
| G07B 17/00 | (2006.01) | |
| H04M 3/493 | (2006.01) | |
| G06F 21/10 | (2013.01) | |
| G06F 21/32 | (2013.01) | |
| G06Q 10/10 | (2012.01) | |
| G10L 13/02 | (2013.01) | |

(52) U.S. Cl.
CPC ........ *H04L 9/3247* (2013.01); *G06F 17/2288* (2013.01); *G06F 17/241* (2013.01); *G06F 17/289* (2013.01); *G10L 13/02* (2013.01); *G10L 15/26* (2013.01); *G10L 17/00* (2013.01)

(56) References Cited

U.S. PATENT DOCUMENTS

| | | | |
|---|---|---|---|
| 5,825,880 A | 10/1998 | Sudia et al. | |
| 5,910,987 A | 6/1999 | Ginter et al. | |
| 6,073,101 A * | 6/2000 | Maes | G10L 15/065 704/231 |
| 6,091,835 A | 7/2000 | Smithies et al. | |
| 6,157,935 A * | 12/2000 | Tran | G06F 3/1454 382/187 |
| 6,240,091 B1 | 5/2001 | Ginzboorg et al. | |
| 6,615,234 B1 | 9/2003 | Adamske et al. | |
| 6,691,089 B1 * | 2/2004 | Su | G06F 21/32 704/244 |
| 6,928,421 B2 | 8/2005 | Craig et al. | |
| 6,959,382 B1 | 10/2005 | Kinnis et al. | |
| 7,206,938 B2 | 4/2007 | Bender | |
| 7,562,053 B2 | 7/2009 | Twining | |
| 7,581,109 B2 | 8/2009 | De Boursetty et al. | |
| 7,694,143 B2 | 4/2010 | Karimisetty et al. | |
| 7,779,355 B1 * | 8/2010 | Erol | G06F 17/30253 715/231 |
| 7,895,166 B2 | 2/2011 | Foygel et al. | |
| 7,996,367 B2 | 8/2011 | Foygel et al. | |
| 7,996,439 B2 | 8/2011 | Foygel et al. | |
| 8,126,868 B1 * | 2/2012 | Vincent | G06F 17/30893 707/708 |
| 8,230,232 B2 | 7/2012 | Ahmed | |
| 8,234,494 B1 * | 7/2012 | Bansal | G10L 17/24 713/176 |
| 8,332,253 B1 | 12/2012 | Farmer | |
| 8,443,443 B2 | 5/2013 | Nordstrom | |
| 8,844,055 B2 | 9/2014 | Follis et al. | |
| 8,918,311 B1 * | 12/2014 | Johnson | H04N 21/23433 348/461 |
| 8,930,308 B1 * | 1/2015 | Johnson | G06F 17/30899 707/610 |
| 9,058,515 B1 | 6/2015 | Amtrup et al. | |
| 9,059,858 B1 * | 6/2015 | Giardina | H04L 9/3226 |
| 9,292,876 B1 | 3/2016 | Shimkus | |
| 9,432,368 B1 | 8/2016 | Saxena et al. | |
| 2001/0002485 A1 | 5/2001 | Brisbee | |
| 2002/0038290 A1 * | 3/2002 | Cochran | G06F 21/645 705/50 |
| 2002/0062322 A1 | 5/2002 | Genghini | |
| 2002/0091651 A1 | 7/2002 | Petrogiannis | |
| 2002/0095290 A1 * | 7/2002 | Kahn | G10L 15/063 704/260 |
| 2002/0103656 A1 * | 8/2002 | Bahler | G10L 17/24 706/14 |
| 2003/0009513 A1 | 1/2003 | Ludwig | |
| 2003/0037004 A1 | 2/2003 | Buffum et al. | |
| 2003/0074216 A1 | 4/2003 | Salle | |
| 2003/0083906 A1 | 5/2003 | Howell et al. | |
| 2003/0130953 A1 * | 7/2003 | Narasimhan | G06F 21/10 705/59 |
| 2003/0154083 A1 * | 8/2003 | Kobylevsky | G06F 19/3406 704/270.1 |
| 2003/0177361 A1 | 9/2003 | Wheeler | |
| 2003/0187671 A1 | 10/2003 | Kumhyr et al. | |
| 2003/0217275 A1 | 11/2003 | Bentley et al. | |
| 2004/0024688 A1 * | 2/2004 | Bi | G06F 21/10 705/37 |
| 2004/0102959 A1 * | 5/2004 | Estrin | G06F 21/32 704/8 |
| 2004/0139344 A1 | 7/2004 | Maurer | |
| 2004/0167847 A1 * | 8/2004 | Nathan | G06Q 40/04 705/37 |
| 2004/0187037 A1 | 9/2004 | Checco | |
| 2004/0204939 A1 * | 10/2004 | Liu | G10L 15/28 704/239 |
| 2004/0225887 A1 * | 11/2004 | O'Neil | H04L 63/083 713/193 |
| 2004/0243811 A1 | 12/2004 | Frisch et al. | |
| 2004/0264652 A1 * | 12/2004 | Erhart | G10L 15/26 379/88.01 |
| 2005/0132196 A1 * | 6/2005 | Dietl | G06F 21/64 713/176 |
| 2005/0228665 A1 * | 10/2005 | Kobayashi | G06F 17/3082 704/246 |
| 2005/0228999 A1 | 10/2005 | Jerdonek et al. | |
| 2005/0289345 A1 | 12/2005 | Haas et al. | |
| 2006/0020460 A1 * | 1/2006 | Itou | G10L 17/24 704/246 |
| 2006/0041828 A1 * | 2/2006 | King | H04N 1/00244 715/205 |
| 2006/0110011 A1 | 5/2006 | Cohen et al. | |
| 2006/0122880 A1 | 6/2006 | Franco | |
| 2006/0143462 A1 * | 6/2006 | Jacobs | G06F 21/64 713/181 |
| 2006/0157559 A1 | 7/2006 | Levy et al. | |
| 2006/0212813 A1 | 9/2006 | Yalovsky et al. | |
| 2006/0253324 A1 * | 11/2006 | Miller | G06Q 30/02 705/14.14 |
| 2006/0280339 A1 | 12/2006 | Cho | |
| 2007/0055517 A1 * | 3/2007 | Spector | G06F 21/32 704/246 |
| 2007/0113164 A1 | 5/2007 | Hansen et al. | |
| 2007/0124507 A1 * | 5/2007 | Gurram | G06F 3/0481 710/1 |
| 2007/0143398 A1 * | 6/2007 | Graham | G06Q 40/02 709/204 |

(56) References Cited

U.S. PATENT DOCUMENTS

| | | | |
|---|---|---|---|
| 2007/0220614 A1* | 9/2007 | Ellis .................. G06F 21/6245 726/27 |
| 2007/0226511 A1 | 9/2007 | Wei et al. |
| 2008/0015883 A1* | 1/2008 | Hermann ............ G06F 21/6245 705/317 |
| 2008/0177550 A1* | 7/2008 | Mumm .................. G06F 21/32 704/273 |
| 2008/0180213 A1* | 7/2008 | Flax ..................... G06F 19/322 340/5.84 |
| 2008/0195389 A1* | 8/2008 | Zhang .................. G10L 17/24 704/246 |
| 2008/0209229 A1 | 8/2008 | Ramakrishnan |
| 2009/0025087 A1 | 1/2009 | Peirson |
| 2009/0062944 A1* | 3/2009 | Wood ................ G06F 17/30038 700/94 |
| 2009/0112767 A1 | 4/2009 | Hammad et al. |
| 2009/0116703 A1* | 5/2009 | Schultz .................. G06F 21/32 382/118 |
| 2009/0117879 A1 | 5/2009 | Pawar et al. |
| 2009/0177300 A1* | 7/2009 | Lee .................. G11B 20/10527 700/94 |
| 2009/0222269 A1* | 9/2009 | Mori ...................... G10L 13/04 704/261 |
| 2009/0228584 A1 | 9/2009 | Maes et al. |
| 2009/0254345 A1* | 10/2009 | Fleizach .............. G10L 13/043 704/260 |
| 2009/0254572 A1* | 10/2009 | Redlich ................. G06Q 10/06 |
| 2009/0260060 A1* | 10/2009 | Smith .................. H04L 63/105 726/3 |
| 2009/0307744 A1 | 12/2009 | Nanda et al. |
| 2009/0327735 A1 | 12/2009 | Feng et al. |
| 2010/0131533 A1 | 5/2010 | Ortiz |
| 2010/0161993 A1* | 6/2010 | Mayer .................... G06F 21/64 713/178 |
| 2010/0281254 A1* | 11/2010 | Carro .................. H04L 63/0428 713/162 |
| 2010/0306670 A1 | 12/2010 | Quinn et al. |
| 2011/0022940 A1* | 1/2011 | King .................. G06F 17/30011 715/229 |
| 2011/0047385 A1* | 2/2011 | Kleinberg ............... G06F 21/64 713/176 |
| 2011/0212717 A1 | 9/2011 | Rhoads et al. |
| 2011/0225485 A1* | 9/2011 | Schnitt .............. G06F 17/2288 715/222 |
| 2012/0072837 A1 | 3/2012 | Triola |
| 2012/0190405 A1* | 7/2012 | Kumaran ............. H04M 1/0266 455/556.2 |
| 2012/0254332 A1* | 10/2012 | Irvin ...................... H04L 51/08 709/206 |
| 2013/0006642 A1* | 1/2013 | Saxena .................. G10L 17/00 704/273 |
| 2013/0046645 A1* | 2/2013 | Grigg .................... G06Q 30/06 705/26.1 |
| 2013/0089300 A1* | 4/2013 | Soundararajan ..... H04N 9/8205 386/241 |
| 2013/0103723 A1* | 4/2013 | Hori .................. G06F 17/30997 707/803 |
| 2013/0132091 A1* | 5/2013 | Skerpac ................ G10L 17/005 704/273 |
| 2013/0138438 A1* | 5/2013 | Bachtiger .......... G06F 17/30038 704/235 |
| 2013/0166915 A1* | 6/2013 | Desai .................... H04L 9/3247 713/176 |
| 2013/0179171 A1* | 7/2013 | Howes .................. G10L 15/26 704/270 |
| 2013/0182002 A1* | 7/2013 | Macciola ............... H04N 1/387 345/589 |
| 2013/0191287 A1* | 7/2013 | Gainer, III .......... G06Q 10/101 705/44 |
| 2013/0263283 A1 | 10/2013 | Peterson |
| 2013/0269013 A1* | 10/2013 | Parry ..................... H04L 9/0866 726/7 |
| 2013/0283189 A1* | 10/2013 | Basso .................. H04L 65/403 715/753 |
| 2013/0326225 A1 | 12/2013 | Murao |
| 2013/0339358 A1* | 12/2013 | Huibers ............ G06F 17/30165 707/737 |
| 2013/0346356 A1* | 12/2013 | Welinder .......... G06F 17/30598 706/52 |
| 2014/0019761 A1* | 1/2014 | Shapiro .................. H04L 9/3247 713/176 |
| 2014/0019843 A1* | 1/2014 | Schmidt ................ G06F 17/241 715/230 |
| 2014/0078544 A1* | 3/2014 | Motoyama .......... G06F 21/6218 358/1.15 |
| 2014/0079297 A1 | 3/2014 | Tadayon et al. |
| 2014/0108010 A1* | 4/2014 | Maltseff ................. G06F 3/167 704/235 |
| 2014/0168716 A1* | 6/2014 | King ..................... G06Q 10/10 358/473 |
| 2014/0236978 A1* | 8/2014 | King .................. G06F 17/30011 707/758 |
| 2014/0244451 A1* | 8/2014 | Mayer ............... G06Q 20/40145 705/30 |
| 2014/0279324 A1* | 9/2014 | King ..................... G06Q 30/04 705/34 |
| 2014/0282243 A1 | 9/2014 | Eye et al. |
| 2014/0294302 A1* | 10/2014 | King .................. G06F 17/30011 382/177 |
| 2014/0343943 A1* | 11/2014 | Al-Telmissani ........ G06F 21/32 704/246 |
| 2014/0365281 A1* | 12/2014 | Onischuk ................ G07C 13/00 705/12 |
| 2014/0372115 A1* | 12/2014 | LeBeau ............. H04M 1/72552 704/235 |
| 2015/0012417 A1* | 1/2015 | Joao ....................... G06Q 20/32 705/39 |
| 2015/0016661 A1* | 1/2015 | Lord ................ H04N 21/42203 382/100 |
| 2015/0063714 A1* | 3/2015 | King ....................... G06K 9/72 382/229 |
| 2015/0073823 A1 | 3/2015 | Ladd et al. |
| 2015/0100578 A1* | 4/2015 | Rosen ................. G06F 17/2247 707/737 |
| 2015/0213404 A1 | 7/2015 | Follis |
| 2015/0245111 A1* | 8/2015 | Berry ................. G06F 17/30017 725/34 |
| 2015/0294094 A1* | 10/2015 | Hefeeda ................ G06F 21/105 726/32 |
| 2016/0078869 A1* | 3/2016 | Syrdal ..................... G10L 17/24 382/118 |

OTHER PUBLICATIONS

Simske, Steven J. Dynamic Biometrics: The Case for a Real-Time Solution to the Problem of Access Control, Privacy and Security. 2009 First IEEE International Conference on Biometrics, Identiy and Security. Pub. Date: 2009. http://ieeexplore.ieee.org/stamp/stam.jsp?tp=&arnumber=5507535.

Maeder, Anthony; Fookes, Clinton; Sridharan, Sridha. Gaze Based User Authentication for Personal Computer Applications. Proceedings of 2004 International Symposium on Intelligent Multimedia, Video and Speech Processing. Pub. Date: 2004. http://ieeexplore.ieee.org/stamp/stamp.jsp?tp=&arnumber=1434167.

Notice of Allowance received in U.S. Appl. No. 14/107,967 (dated Nov. 3, 2016) (6 pages).

Notice of Allowance received in U.S. Appl. No. 14/551,560 (dated Nov. 4, 2016) (19 pages).

Notice of Allowance received in U.S. Appl. No. 14/534,583 (8 pages) (dated May 2, 2017).

Araújo et al., "User Authentication Through Typing Biometrics Features", IEEE Transactions on Signal Processing, vol. 53, No. 2, pp. 851-855 (2005).

Deng et al., "Keystroke Dynamics User Authentication Based on Gaussian Mixture Model and Deep Belief Nets", ISRN Signal Processing, vol. 2013, Article ID 565183, 7 pages (2013).

(56) References Cited

OTHER PUBLICATIONS

Moskovitch et al., "Identity Theft, Computers and Behavioral Biometrics", Proceedings of the 2009 IEEE International Conference on Intelligence and Security Informatics, pp. 155-160 (2009).
Notice of Allowance in related U.S. Appl. No. 14/859,944 dated Mar. 1, 2017, 10 pages.
Notice of Allowance received in U.S. Appl. No. 14/840,380 (11 pages) (dated Aug. 23, 2017).

* cited by examiner

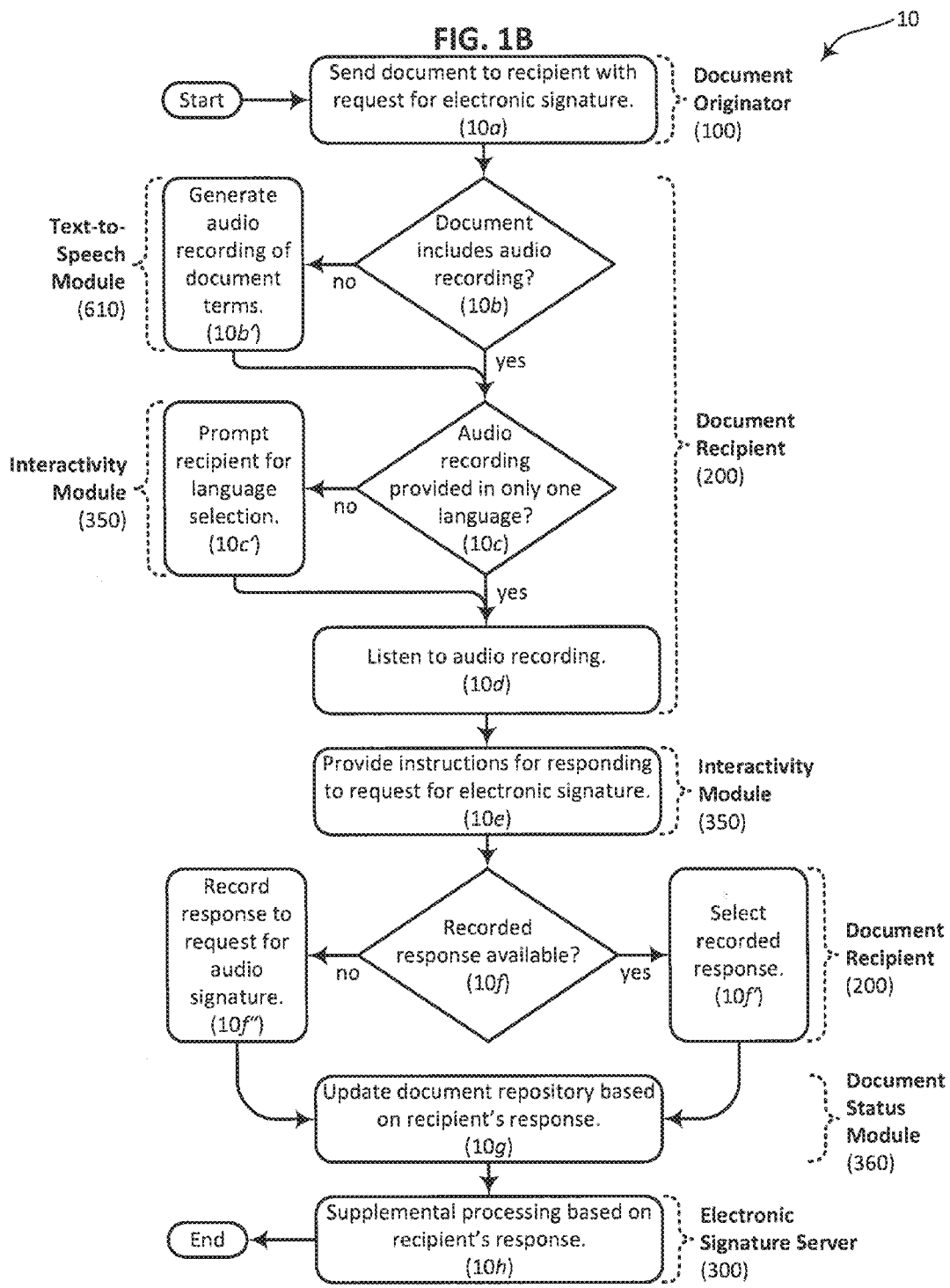

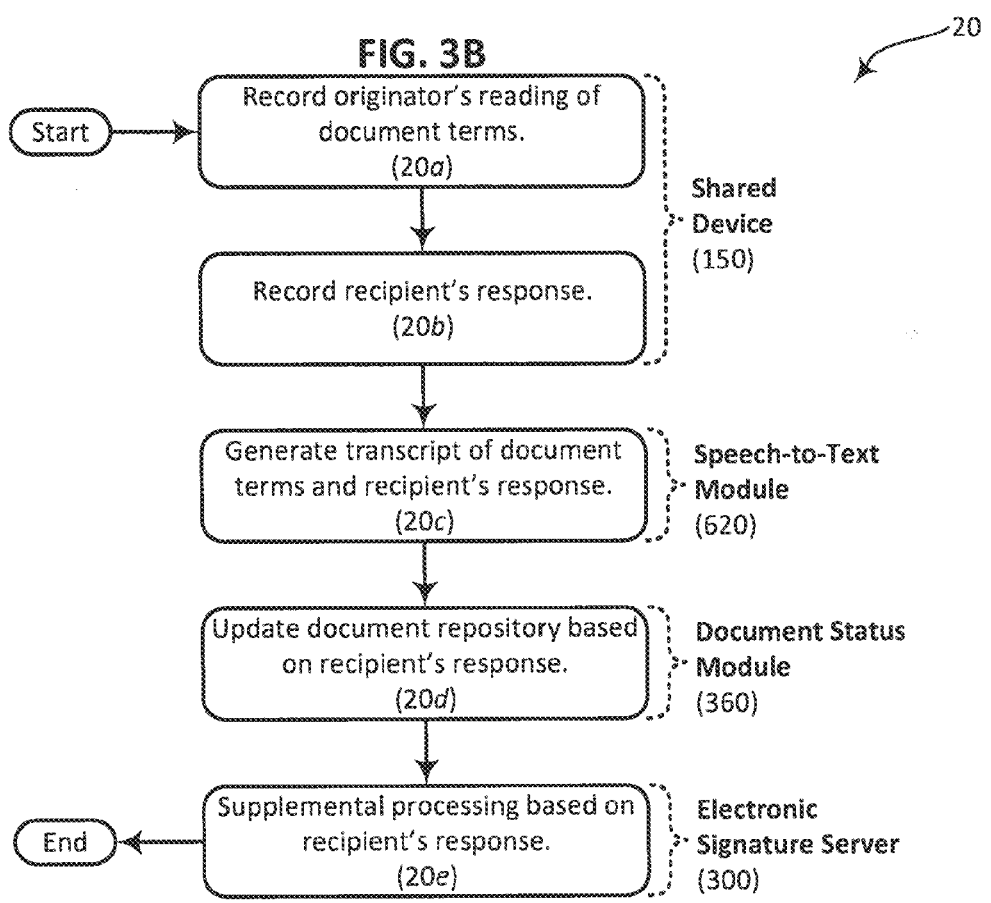

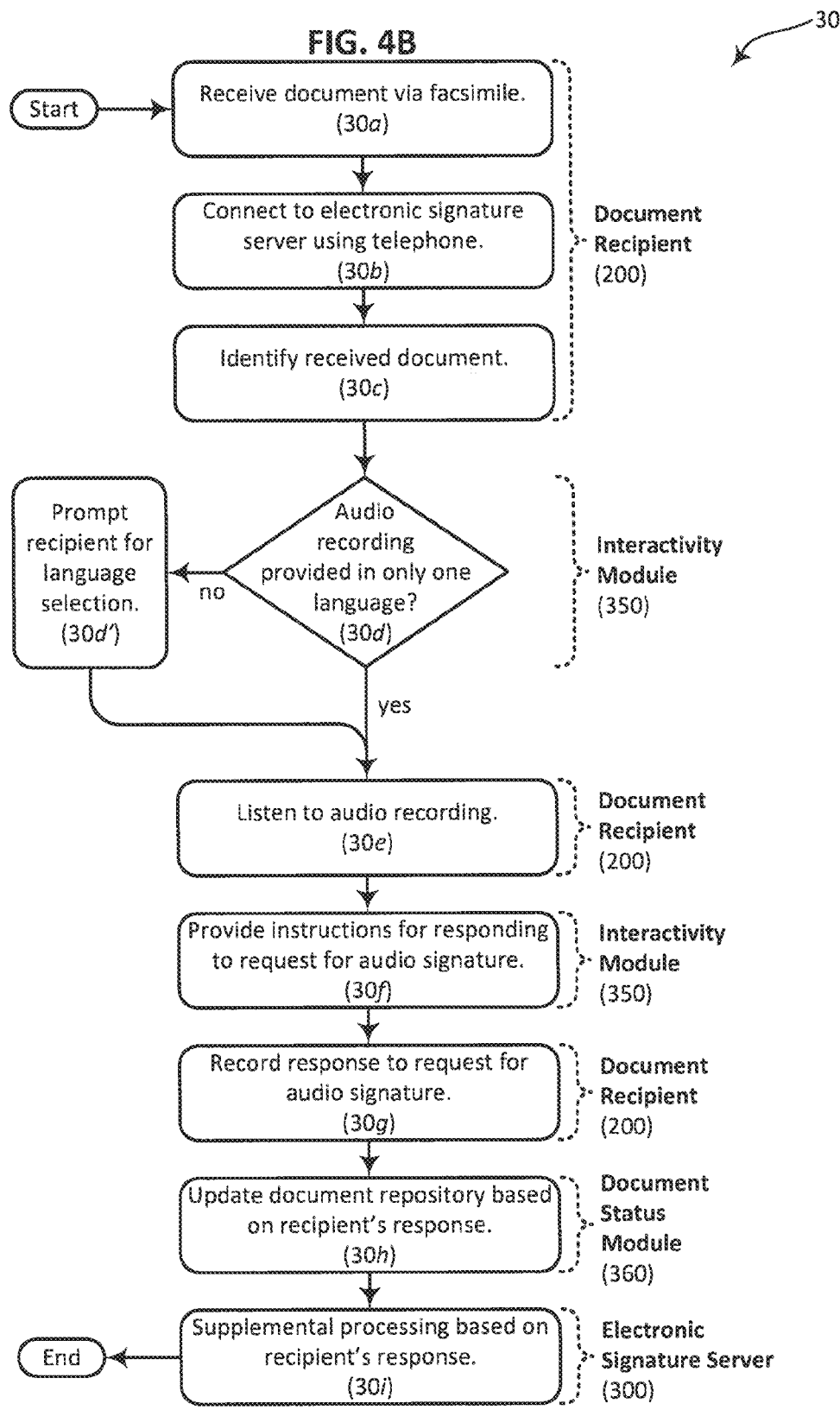

DOCUMENT DISTRIBUTION AND INTERACTION

FIELD OF THE DISCLOSURE

This disclosure relates generally to document processing workflows, and more specifically to workflows that enable documents to be distributed, assented to, and otherwise interacted with on an aural and/or oral basis.

BACKGROUND

Computers and electronic documents have become an increasingly indispensable part of modern life. In particular, as virtual storage containers for binary data, electronic documents have gained acceptance not only as a convenient replacement for conventional paper documents, but also as a useful way to store a wide variety of digital assets such as webpages, sound recordings, and videos. The increased use of electronic documents has resulted in the adaptation of conventional paper-based document processing workflows to the electronic realm. One such adaptation has been the increased use and acceptance of electronic signatures on agreements, contracts, and other documents. When negotiating parties reach an agreement with respect to a course of action, state of affairs, or other subject matter, the resulting agreement is usually reduced to writing and executed by the parties as a way to memorialize the terms of the agreement. Traditionally, a physical copy of the agreement was executed with a personalized stamp, seal, or handwritten signature. However, since this "reduction to writing" now often takes the form of an electronic document stored on a computer readable medium, electronic signatures have become commonplace and have indeed gained widespread legal recognition. Even where an agreement is never actually reduced to writing, the resulting "oral contract" may still be enforceable if evidentiary questions as to the substance of the underlying agreement can be resolved. The wide variety of different formats and legal requirements relating to agreements has resulted in a correspondingly wide variety of workflows—both conventional and electronic—that facilitate the negotiation, formation, execution, and management of agreements, contracts, and other documents.

BRIEF DESCRIPTION OF THE DRAWINGS

FIG. 1B is a flowchart illustrating a method for providing a document recipient with an audio recording of a document that can be interacted with and responded to orally, in accordance with an embodiment of the present invention.

FIG. 3B is a flowchart illustrating a method for recording an agreed-upon document by users of a shared device in accordance with an embodiment of the present invention.

FIG. 4B is a flowchart illustrating a method for providing a document recipient with an audio recording of a document that can be interacted with and responded to orally using a telephone, in accordance with an embodiment of the present invention.

DETAILED DESCRIPTION

Figure 1A:
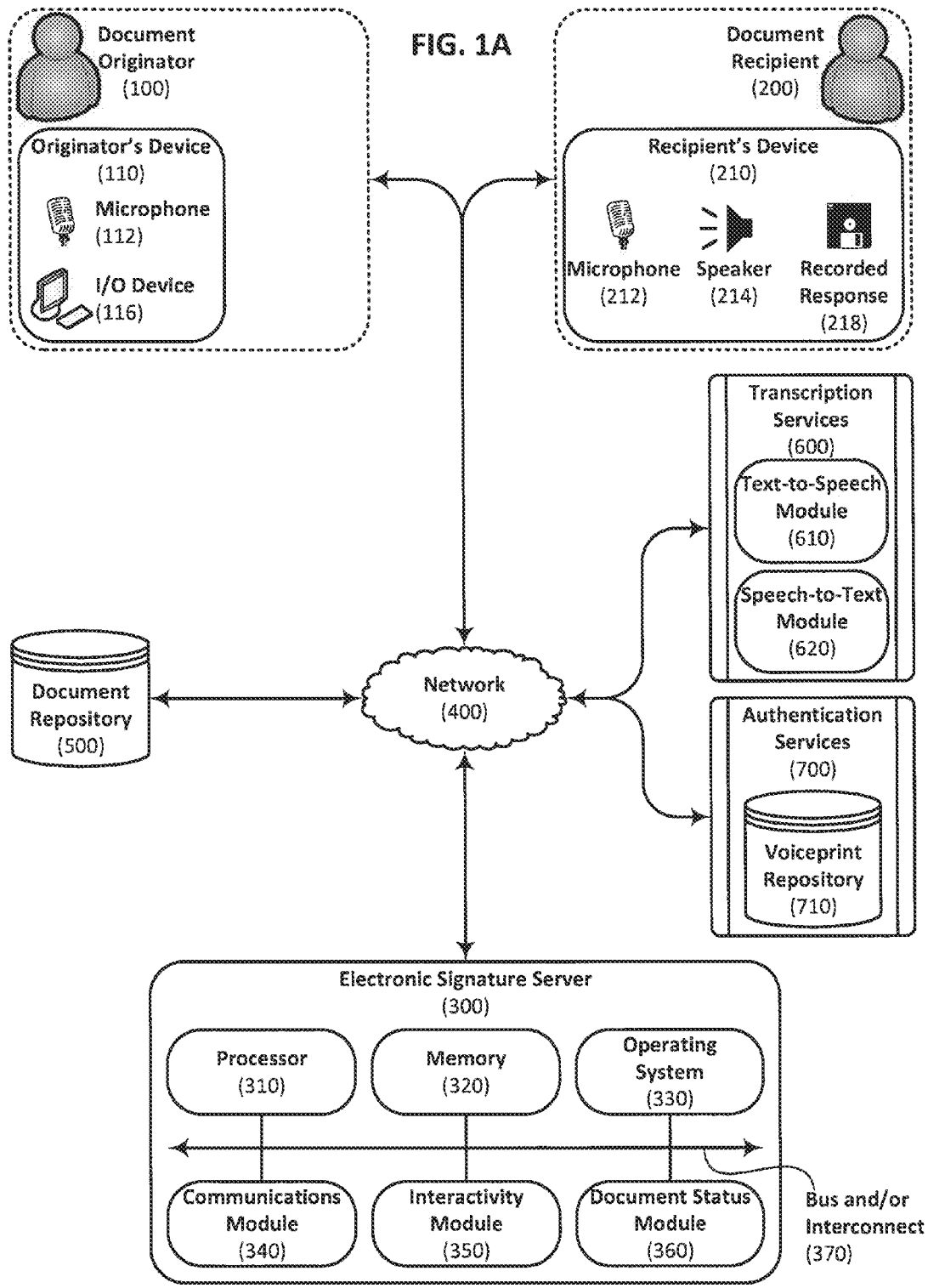
FIG. 1A is a block diagram illustrating selected components of a system that allows a document recipient to interact with and respond to a document aurally and/or orally, in accordance with an embodiment of the present invention.

While many efficiencies and benefits have been derived from the implementation of workflows based on electronic signatures, such workflows still suffer from several shortcomings and disadvantages. For example, many people lack the ability to read visual information on a computer screen. This could be caused by a physical disability, a lack of literacy in the language used to convey the content, or some other reason. Screen readers and text-to-speech software may be used to convert a textual document into audible speech, but such tools have limited utility if the document content is available only as a bitmap image or if the content cannot be decoded properly, such as due to the presence of foreign language content. Moreover, software associated with screen readers and text-to-speech tools is often expensive, tends to consume substantial computational resources, and usually needs be installed on every terminal used by a particular end user. In addition, just as many people lack the ability to read an electronic document, many people lack the ability to execute an electronic signature. This may be caused by a physical disability, a lack of access to or familiarity with appropriate computer resources, or some other reason. Voice recognition software may address some of these problems in some circumstances, but it also can suffer from the same shortcomings associated with screen readers and text-to-speech tools. Voice recognition software also often requires training to a particular individual's vocal patterns. These challenges represent substantial obstacles to the further deployment of electronic document workflows, particularly with respect to document recipients who have limited access to computer resources.

Thus, and in accordance with certain embodiments of the present invention, workflows are provided herein that enable documents to be distributed, assented to, and otherwise interacted with on an aural and/or oral basis. Certain of the workflows disclosed herein can be implemented in a way that allows a recipient to receive, understand, and interact with a document using, for example, conventional components such as the microphone and speaker provided by a telephone. For instance, in one embodiment a document originator may send a document to a recipient with a request for an electronic signature. The document may include a link to a networked electronic signature server, and optionally, an audio version of the document terms. Following the link allows the recipient to access functionality provided by the electronic signature server, which can be configured to interact with the recipient using voice prompts and/or spoken commands. This can allow the recipient to, for example, listen to the audio version of the document terms and record an electronic signature that represents assent to such terms. The electronic signature server can record the recipient's electronic signature and incorporate it into the document, such that it forms part of the electronic document just as a traditional handwritten signature forms part of a signed paper document. This advantageously allows the recipient to interact with the document aurally and orally without having access to specialized computer hardware and/or software.

This also eliminates any need for the recipient to print, manually sign, and send or otherwise further process a paper document. The resulting signed electronic document can be processed according to a wide variety of existing or subsequently developed electronic document processing workflows. The electronic signature server can be used by a large number of document originators and recipients using a variety of devices having various capabilities, including devices such as public kiosks, smartphones, and tablet computers. Numerous configurations and variations of such embodiments will be apparent in light of this disclosure.

As used herein, the term "document" refers, in addition to its ordinary meaning, to any collection of information that can be communicated between users of the various systems disclosed herein. As used herein, the term "document terms" refers, in addition to its ordinary meaning, to content provided within, or accessible via, a document. A document can take the form of a physical object, such as one or more papers containing printed information, or in the case of an "electronic document", a computer readable medium containing digital data. Electronic documents can be rendered in a variety of different ways, such as via display on a screen, by printing using an output device, or aurally using an audio player and/or text-to-speech software. Thus it will be appreciated that electronic documents may include digital assets in addition to or instead of text; such digital assets may include, for example, audio clips, video clips, photographs, and other multimedia assets. Documents may encompass a virtually unlimited range of subject matter, including documents that contain terms that are to be agreed to among various participants in a given workflow. Examples of such documents include agreements, settlements, and legally binding contracts. For instance, both a word processing file containing the terms of a legally enforceable contract as well as a compressed audio file containing an audio recording of the same contract terms would both be considered "documents" for the purposes of this disclosure. Such textual and audio components may be combined into a single "document" in certain embodiments. Documents may be communicated amongst users by a variety of techniques ranging from physically moving papers containing printed matter to wired and/or wireless transmission of digital data.

As used herein, the term "document originator" (or "originator") refers, in addition to its ordinary meaning, to a user or entity that represents the source of a document in a workflow. Likewise, the term "document recipient" (or "recipient") refers, in addition to its ordinary meaning, to a user or entity that represents the target of a document in a workflow. Thus, in a generalized workflow, a document originator can be understood as sending a document to a document recipient. It will be appreciated that a document originator may not necessarily be the creator, author, or generator of a particular document, but rather may simply be a user or entity that initiates a workflow by sending a document to a recipient. Likewise, the document recipient may not be the ultimate recipient of a document, particularly where a document is routed amongst multiple users in a given workflow. Thus, a single user or entity may act as both a document originator and a document recipient in different contexts. It will also be appreciated that the terms document originator and document recipient are not limited to people or users, but may also refer to entities, organizations, or workstations which originate or receive documents as part of a workflow. Finally, a given workflow may not necessarily involve the document itself being transmitted from document originator to document recipient; in some cases other data relating to a document, such as metadata and/or a network address, may be transmitted between a document originator and a document recipient.

As used herein, the term "electronic signature" refers, in addition to its ordinary meaning, to data that can be attached to or logically associated with an electronic document. Thus an electronic signature may comprise, for example, a string of characters, a bitmap image such as an image of a handwritten signature, an audio recording of a person saying a spoken phrase such as "I agree to these terms," or a digital key. Electronic signatures may or may not be encrypted or otherwise encoded in a way that limits access and/or modification by unauthorized parities. An electronic signature may be personalized and associated with a particular individual, or may be generated automatically in response to a specified user input, such as the selection of an electronic checkbox, the clicking of a button on a graphical user interface, or the generation of a touch-tone using a telephone keypad. It will be appreciated that an electronic signature need not necessarily be incorporated into a particular electronic document, but may simply be stored in a resource managed by, for example, an electronic signature server, which can then create a logical association between the electronic signature and a particular electronic document. Where an electronic signature is encoded using binary digits, it may also be referred to as a "digital signature". Examples of products which provide services associated with an electronic signature server include Adobe Echosign (Adobe Systems Incorporated, San Jose, Calif.) and DocuSign eSignature (DocuSign, Inc., San Francisco, Calif.).

System Architecture

FIG. 1A is a block diagram illustrating selected components of a system that allows a document recipient to interact with and respond to a document aurally and/or orally. More specifically, the system illustrated in FIG. 1A can be understood as enabling a document originator 100 and a document recipient 200 to interact with each other in a workflow that is managed by an electronic signature server 300. In such embodiments, document originator 100, document recipient 200, and electronic signature server 300 can communicate with each other via network 400. Network 400 can also be used to access supplementary services and resources, such as a networked document repository 500, transcription services 600, and authentication services 700. Additional or alternative services and resources may be provided in other embodiments. In some cases one or more of such services and resources may be integrated into and provided by one or more of document originator 100, document recipient 200, or electronic signature server 300, as will be described in turn. Thus other embodiments may have fewer or more networked services and/or resources depending on the granularity of implementation. It will therefore be appreciated that the present invention is not intended to be limited to provision or exclusion of any particular services and/or resources.

As illustrated in FIG. 1A, document originator 100 has access to a device 110 that includes components such as a microphone 112 and/or any other appropriate input/output device 116. For example, in certain embodiments device 110 may comprise one or more of a variety of suitable computing devices, including devices such as handheld computers, cellular telephones, tablet computers, smartphones, laptop computers, desktop computers, and set-top boxes. Other devices may be used in other embodiments. In such embodiments device 110 enables document originator 100 to interact with other users and/or other components of the various systems that are illustrated in FIG. 1A and/or described herein. For example, in certain embodiments device 110 includes a wired and/or wireless communication adapter that enables communication via network 400. In general, device 110 may include additional or alternative components as compared to those illustrated in FIG. 1A, and it will be appreciated that the present invention is not intended to be limited to any particular configuration of device 110 used by document originator 100.

In certain embodiments device 110 provides functionality that enables document originator 100 to generate a new document, modify an existing document, or retrieve an existing document from a storage device, such as a local storage device, networked document repository 500, or a storage resource hosted by electronic signature server 300. Documents may also be received from other users as part of a larger overarching workflow. For example, in one embodiment device 110 can be used to draft a new bill of sale for an automobile that document originator 100 wishes to sell. In another embodiment a contract provider can send an email to document originator 100 containing standard terms for an automobile bill of sale which originator 100 can then modify to conform to the particular requirements of his/her desired application. In any case, microphone 112 enables document originator 100 to generate an audio version of the terms of the document, which may include either a word-for-word transcription of the document or an audio summary of selected terms. Thus document originator 100 may use device 110 to generate a document that includes both textual and audio components. The textual and audio components of the document may be stored together as a single document or may be stored separately but connected by a logical association such as a network link.

Still referring to FIG. 1A, document recipient 200 has access to a device 210 that includes components such as a microphone 212 and a speaker 214. For example, in certain embodiments device 210 comprises a telephone, such as a conventional wired telephone, a cellular telephone, or a smartphone. In other embodiments device 210 may comprise one or more of a variety of suitable computing devices, such as a handheld computer, a tablet computer, a laptop computer, a desktop computer, or a set-top box. Other devices may be used in other embodiments. In such embodiments device 210 enables document recipient 200 to interact with other users and/or other components of the various systems that are illustrated in FIG. 1A and/or described herein. For example, device 210 may comprise a telephone capable of connecting to other components via a public switched telephone network (PSTN). In other embodiments device 210 includes a wired and/or wireless communication adapter that enables digital communication via network 400. In general, device 210 may include additional or alternative components as compared to those illustrated in FIG. 1A, and it will be appreciated that the present invention is not intended to be limited to any particular configuration of device 210 used by document recipient 200.

In certain embodiments device 210 provides functionality that enables document recipient 200 to interact with and respond to a received document aurally and/or orally. For example, upon receiving a document containing both textual and audio components as described herein, speaker 214 can be used to playback the audio component of the received document. Speaker 214 can also be used to play voice prompts that are generated by electronic signature server 300. Recipient 200 can use microphone 212 to respond to such voice prompts. Thus, after listening to the audio component of the received document, recipient 200 can record an appropriate response such as a spoken electronic signature. Specifically, a spoken phrase by the recipient, such as "I agree to these terms," can be recorded, digitized and incorporated into and stored together with the received document. Electronic signature server 300 can also be configured to record and/or respond appropriately to other spoken commands, such as "I do not agreed to these terms," or "Forward this document to John Doe". In certain embodiments one or more prerecorded responses 218 can be stored on the recipient's device 210 and applied to a received document in accordance with a command provided by document recipient 200. This may be particularly useful where recipient 200 must frequently select an appropriate response to a received document from amongst a set of frequently used responses. Regardless of whether the document recipient 200 responds with a prerecorded response or otherwise, the audio response can be incorporated into and stored together with the received document. The resulting modified document can be further processed according to a pre-established workflow.

Referring still to the example embodiment illustrated in FIG. 1A, electronic signature server 300 can be configured to manage and orchestrate workflows that enable documents provided by document originator 100 to be distributed to document recipient 200, and that enable document recipient 200 to electronically sign or otherwise interact with such documents. To this end, electronic signature server 300 includes one or more modules configured to implement certain of the functionalities disclosed herein, and optionally further includes hardware configured to enable such implementation. This hardware may include, but is not limited to, a processor 310, a memory 320, an operating system 330, and a communications module 340. Processor 310 can be any suitable processor, and may include one or more coprocessors or controllers, such as an audio processor or a graphics processing unit, to assist in processing operations of electronic signature server 300. Memory 320 can be implemented using any suitable type of digital storage, such as one or more of a disk drive, a universal serial bus (USB) drive, flash memory, and/or random access memory. Operating system 330 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with electronic signature server 300, and therefore may also be implemented using any suitable existing or subsequently-developed platform. Communications adaptor 340 can be any appropriate network chip or chipset which allows for wired and/or wireless communication via network 400 to one or more of the other components described herein. A bus and/or interconnect 370 may also be provided to allow for inter- and intra-device communications using, for example, communications adaptor 340.

In certain embodiments electronic signature server 300 includes an interactivity module 350 configured to provide an interface to users accessing the workflows and resources managed by electronic signature server 300. Such an interface may be provided by way of a graphical user interface rendered on a digital display, although other types of interfaces, such as voice response, touch-tone, or textual interfaces, can be implemented as well. The user interfaces can be provided to one or more document originators 100 and/or one or more document recipients 200. For example, in one embodiment interactivity module 350 is configured to generate a graphical user interface capable of receiving commands, parameters, and/or other metadata that define a workflow from document originator 100. Such parameters may specify, for example, how a particular document is to be routed amongst one or more document recipients 200 and how electronic signature server 300 should respond to various interactions between a particular document recipient 200 and the particular document. Likewise, interactivity module 350 can also be configured to generate a user interface capable of guiding a document recipient 200 through the process of receiving, reviewing, electronically signing (or declining to electronically sign), and/or otherwise interacting with a document. Thus in certain embodiments interactivity module 350 is capable of providing audible voice prompts to, and responding to spoken commands from, document recipient 200. Additional or alternative workflow aspects may be specified in other embodiments, and thus it will be appreciated that the present invention is not intended to be limited to any particular functionality provided by interactivity module 350.

As illustrated in FIG. 1A, electronic signature server 300 may also include a document status module 360 in certain embodiments. Document status module 360 can be configured to manage the status of documents used in a workflow orchestrated by electronic signature server 300. To this end, in certain embodiments document status module 360 comprises a document status database or other document status data structure that stores information with respect to documents used in a given workflow. Such information may indicate, for example, whether a particular document has been submitted for signature to a particular document recipient 200, and whether a particular document recipient 200 has signed the document, declined to sign the document, or invoked another workflow process (such as by forwarding the document to another document recipient). Such a data structure may be stored locally at electronic signature server 300, or may be stored remotely at a networked document status repository. Document status module 360 may further comprise software and/or instructions configured to manage such a data structure. In certain embodiments a user can use interactivity module 350 to obtain information from document status module 360, such as by submitting a query to search for, for example, unsigned documents in a given workflow, or the status of a particular document in a given workflow.

Certain embodiments of the system illustrated in FIG. 1A may include supplementary resources and services, such as networked document repository 500 and transcription services 600. For example, the documents managed using the various systems disclosed herein can be stored in a dedicated networked document repository 500, thus advantageously allowing such documents to be accessed by a wide variety of document originators 100 and/or document recipients 200 without regard to whether other components of the system are available at any given time. However in other embodiments documents may be retained in storage that is local to electronic signature server 300, such as provided by memory 320, or in storage that is local to document originator 100 or document recipient 200. Transcription services 600 may include a text-to-speech module 610 and/or a speech-to-text module 620, which can be used to generate an audio version of a document or transcribe a spoken response received from a document recipient 200, respectively. Providing such services by networked resources advantageously eliminates any need for such services to be provided locally at the document originator's device 110 or at the document recipient's device 210. This allows document originators 100 and document recipients 200 to leverage the functionality provided by electronic signature server 300 without the need to obtain specialized hardware or software, thereby providing networked functionality to users of devices having limited processing capability, such as public kiosks, smartphones, and tablet computers. Thus in certain embodiments transcription services 600 may be integrated into and provided by electronic signature server 300.

Another example of supplementary services provided in certain embodiments are authentication services 700. Authentication services 700 can be configured to authenticate document originators 100 and/or document recipients 200 before providing access to resources associated with electronic signature server 300, before accepting an electronic signature, or before enabling other functionalities. Authentication can be provided by any appropriate existing or subsequently-developed authentication scheme. For example, in certain embodiments document recipient 200 can be required to provide a password, public key, private key, or other authentication token before being authorized to apply an electronic signature to, or otherwise respond to, a received document. In other embodiments the authentication token provided by document recipient 200 takes the form of a voiceprint extracted from a spoken electronic signature itself. If the extracted voiceprint matches or substantially matches a voiceprint saved in a voiceprint repository 710, then the electronic signature can be considered to be authentic. The voiceprints can be considered to be substantially matching where there exists a reasonably high likelihood that the voiceprints where generated by the same person. The voiceprint saved in voiceprint repository 710 can be provided as part of an initial registration process completed by document recipient 200. It will be appreciated that the authentication procedures disclosed herein are optional, and that such procedures may be omitted entirely in some embodiments. In other embodiments authentication procedures can be applied to individual documents, such that document originator 100 may specify a password or spoken passphrase for a particular document that must be provided by document recipient 200 before the document is allowed to be signed or otherwise responded to. This provides document originator 100 with some assurance that the document has not been accessed, executed or otherwise interacted with by an unauthorized party.

Document originator 100, document recipient 200, and electronic signature server 300 can communicate with each other via network 400. Network 400 can also be used to access supplementary services and resources, such as networked document repository 500, transcription services 600, and authentication services 700. Network 400 may be a local area network (such as a home-based or office network), a wide area network (such as the Internet), or a combination of such networks, whether public, private, or both. For example, in certain embodiments at least a portion of the functionality associated with network 400 can be provided by a PSTN, thereby allowing a user of a conventional telephone to interact with electronic signature server 300. In general, communications amongst the various entities, resources, and services described herein may occur via wired and/or wireless connections, such as may be provided by Wi-Fi or mobile data networks. In some cases access to resources on a given network or computing system may require credentials such as usernames, passwords, and/or compliance with any other suitable security mechanism. Furthermore, while only one document originator 100 and one document recipient are illustrated in the example embodiment of FIG. 1A, it will be appreciated that in general the system may comprise a distributed network of tens, hundreds, thousands or more document originators 100 and/or document recipients 200 capable of interacting with a correspondingly large number of electronic signature servers 300.

The various embodiments disclosed herein can be implemented in various forms of hardware, software, firmware, and/or special purpose processors. For example, in one embodiment a non-transitory computer readable medium has instructions encoded thereon that, when executed by one or more processors, cause one or more of the document distribution and interaction methodologies disclosed herein to be implemented. The instructions can be encoded using any suitable programming language, such as C, C++, object-oriented C, JavaScript, Visual Basic .NET, BASIC, or alternatively, using custom or proprietary instruction sets. Such instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology.

The functionalities disclosed herein can optionally be incorporated into other software applications, such as document management systems or document viewers. For example, an application configured to view portable document format (PDF) files can be configured to implement certain of the functionalities disclosed herein upon detecting the presence of signature fields or other metadata in a given document, including signature fields intended for a handwritten signature. The systems disclosed herein may also optionally leverage services provided by other software applications, such as electronic mail readers. The computer software applications disclosed herein may include a number of different modules, sub-modules, or other components of distinct functionality, and can provide information to, or receive information from, still other components and/or services. These modules can be used, for example, to communicate with input and/or output devices such as a display screen, a touch sensitive surface, a printer, and/or any other suitable input/output device. Other components and functionality not reflected in the illustrations will be apparent in light of this disclosure, and it will be appreciated that the claimed invention is not intended to be limited to any particular hardware or software configuration. Thus in other embodiments electronic signature server 300 may comprise additional, fewer, or alternative subcomponents as compared to those included in the illustrated embodiments.

The aforementioned non-transitory computer readable medium may be any suitable medium for storing digital information, such as a hard drive, a server, a flash memory, and/or random access memory. In alternative embodiments, the computers and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that the present invention is not intended to be limited to any particular system architecture.

Methodology

FIG. 1B is a flowchart illustrating a method 10 for providing a document recipient with an audio recording of a document that can be interacted with and responded to orally. As can be seen, method 10 includes a number of phases and sub-processes, the sequence of which may vary form one embodiment to another. However, when considered in the aggregate, these phases and sub-processes form a complete document distribution and interaction process that is responsive to user commands in accordance with certain of the embodiments disclosed herein. These methodologies can be implemented, for example, using the system architecture illustrated in FIG. 1A and described herein. However other system architectures can be used in other embodiments, as will be apparent in light of this disclosure. To this end, the correlation of the various functionalities shown in FIG. 1B to the specific components illustrated in FIG. 1A is not intended to imply any structure and/or use limitations. Rather, other embodiments may include, for example, varying degrees of integration where multiple functionalities are effectively performed by one system. For example, in an alternative embodiment a single module can be used to provide user interactivity and maintenance of document status. Thus other embodiments may have fewer or more modules depending on the granularity of implementation. Numerous variations and alternative configurations will be apparent in light of this disclosure.

As illustrated in FIG. 1B, method 10 commences with sending a document to document recipient 200 with a request for an electronic signature (see reference numeral 10a in FIG. 1B). The document may be sent directly from document originator 100, or may be sent from another component of the system, such as electronic signature server 300 or networked document repository 500, in response to a request generated by document originator 100. For example, in one embodiment document originator 100 may select a contract to be sent to recipient 200 from a library of pre-generated contracts or contract templates. Where document recipient 200 cannot or prefers not to review textual documents, a determination can be made with respect to whether the document includes or is otherwise associated with an audio recording corresponding to the document terms (see reference numeral 10b in FIG. 1B). Where no audio recording is available, text-to-speech module 610 can be used to generate an audio recording of the document terms (see reference numeral 10b' in FIG. 1B). While the determination with respect to the audio recording can be made by document recipient 200 in certain embodiments, it will be appreciated that such a determination may be made by other components in other embodiments.

For example, in a modified embodiment electronic signature server 300 is configured to detect the absence of an audio component and, in response to such detection, can be further configured to (a) prompt document originator 100 to record an appropriate audio component, and/or (b) automatically generate an audio component by leveraging functionality provided by text-to-speech module 610. In such cases, electronic signature server 300 can optionally be configured to detect the absence of an audio component before document originator 100 initiates a workflow involving the document. This allows the automatically-generated audio version to be prepared in advance, thereby making the system more responsive to the document originator's initiation of a workflow. In applications where multiple languages are to be supported, a translation service such as a computer-based automated translation service can be invoked to generate versions of the document in one or more alternative languages, which can then be submitted to text-to-speech module 610 for generation of corresponding audio versions of the document in the one or more alternative languages.

Certain embodiments are capable of supporting documents having audio components available in multiple languages. In particular, a determination can be made with respect to whether a given document includes or is otherwise associated with audio recordings in multiple languages (see reference numeral 10c in FIG. 1B). Where audio recordings in multiple languages are available, document recipient 200 can be prompted for a language selection (see reference numeral 10c' in FIG. 1B). Such prompting can be managed by interactivity module 350, for example by providing recipient 200 with an appropriate voice prompt (such as, "Would you like to review the English or Korean version of this document?" or an equivalent inquiry in another language), and responding to an audible command received in response to such prompt. In such embodiments, interactivity module 350 can respond to the recipient's selection by using the selected language for providing subsequent voice prompts provided to recipient 200, and interpreting subsequent spoken commands received from recipient 200. Furthermore, while the determination with respect to the availability of audio recordings in multiple languages can be made by document recipient 200 in certain embodiments, it will be appreciated that such a determination may be made by other components in other embodiments. For example, in a modified embodiment electronic signature server 300 is configured to detect the availability of audio recordings in multiple languages and, in response to such detection to prompt document recipient 200 for a language selection. It will be appreciated that supporting multi-lingual documents advantageously allows a substantially increased user base to take advantage of the various methodologies disclosed herein.

Once an appropriate audio recording has been identified, document recipient 200 can then listen to the audio recording (see reference numeral 10d in FIG. 1B). In certain embodiments the audio recording can be provided to the recipient's device 210 as a compressed audio file which can be decompressed and played locally. In other embodiments the audio recording can be streamed to the recipient's device 210 across network 400, which may be particularly advantageous where the recipient's device 210 lacks the capability to independently decode and/or play audio recordings. This may be the case where, for example, network 400 comprises a PSTN and the recipient's device comprises a conventional telephone. In addition to listening to the audio recording, interactivity module 350 can be configured to provide recipient 200 with instructions for responding to the request for electronic signature (see reference numeral 10e in FIG. 1B). As disclosed herein, such instructions can be provided using voice prompts, and may optionally be responsive to spoken commands provided by document recipient 200. In certain embodiments document recipient is not provided with an opportunity to execute an electronic signature until the audio recording of the contract terms has been played to a predetermined extent, such as played in full.

As disclosed herein, in certain embodiments one or more prerecorded responses 218 can be stored on the recipient's device 210 and applied to a received document in accordance with a command provided by document recipient 200. Thus document recipient 200 can be configured to determine whether one or more prerecorded responses 218 is available (see reference numeral 10f in FIG. 1B). Where one or more prerecorded responses 218 is available, document recipient 200 can be configured to select and apply a particular prerecorded response to the received document (see reference numeral 10f in FIG. 1B). However, where this is not the case, document recipient 200 can record an appropriate response using microphone 212 (see reference numeral 10f in FIG. 1B). Regardless of whether the recipient's response is prerecorded or not, such response may, in some cases, be considered an electronic signature. In other cases the recipient's response may be interpreted as an indication that the recipient has declined to electronically sign the document, or that the recipient wishes to initiate an alternate workflow (for example, by routing the document to an alternate recipient).

For instance, electronic signature server 300 can be configured to analyze the recipient's response and determine whether it sufficiently corresponds to a designated statement indicating assent to the document terms. Specifically, interactivity module 350 can instruct, via voice prompt, document recipient 200 to make a designated statement such as "I agree to the terms of this document," to electronically sign a received document. Where the recipient's response sufficiently corresponds to the designated statement, the statement itself can be considered an electronic signature. Where the recipient's response does not correspond to the designated statement, it can be analyzed to determine whether it corresponds to other spoken commands recognized by interactivity module 350. In an alternative embodiment, document recipient 200 may annotate the received document, either in addition to or instead of electronically signing the document. Such annotation may be transcribed, for example, by leveraging functionality provided by speech-to-text module 620. Analyzing the recipient's response using resources provided by electronic signature server 300 and/or transcription services 600 advantageously eliminates any need for document recipient 200 to have a device capable of providing such functionality. This allows document recipient 200 to obtain such functionality using a traditional telephone, a public kiosk, or other device with limited audio processing capacity or software.

Document repository 500 may be updated depending on the nature of the recipient's response (see reference numeral 10g in FIG. 1B). For example, where recipient 200 provides an electronic signature, the signature can be applied to the document and the signed version of the document can be archived in document repository 500. In an alternative embodiment the signature may be stored separately from the document, but the document as stored in repository 500 may still be modified to include a link to the electronic signature. Document status module 360 may also optionally update a corresponding document status database to indicate that the status of the particular document is "signed". Alternatively, where the document recipient 200 declines to sign the received document, or initiates an alternative workflow with respect to the received document, the document status database may be updated accordingly. For example, where document recipient 200 declines to provide an electronic signature but instead provides an audio annotation—perhaps explaining why he or she declined to execute the document—such audio annotation can be saved with the document in document repository 500.

Thus, it will be appreciated that, in general, a wide range of supplemental processing can be invoked based on exactly how document recipient 200 responds to the request for an electronic signature (see reference numeral 10h in FIG. 1B). For example, in certain embodiments when document recipient 200 signs a document, electronic signature server 300 can be configured to send email notifications containing copies of the document and the electronic signature to particular users. In alternative embodiments a modified document, such as a document including an electronic signature, is stored in networked document repository 500 where document originator 100, document recipient 200, and any other authorized parties may obtain it for future reference, for example in the event a future dispute regarding the document terms arises.

Figure 2:
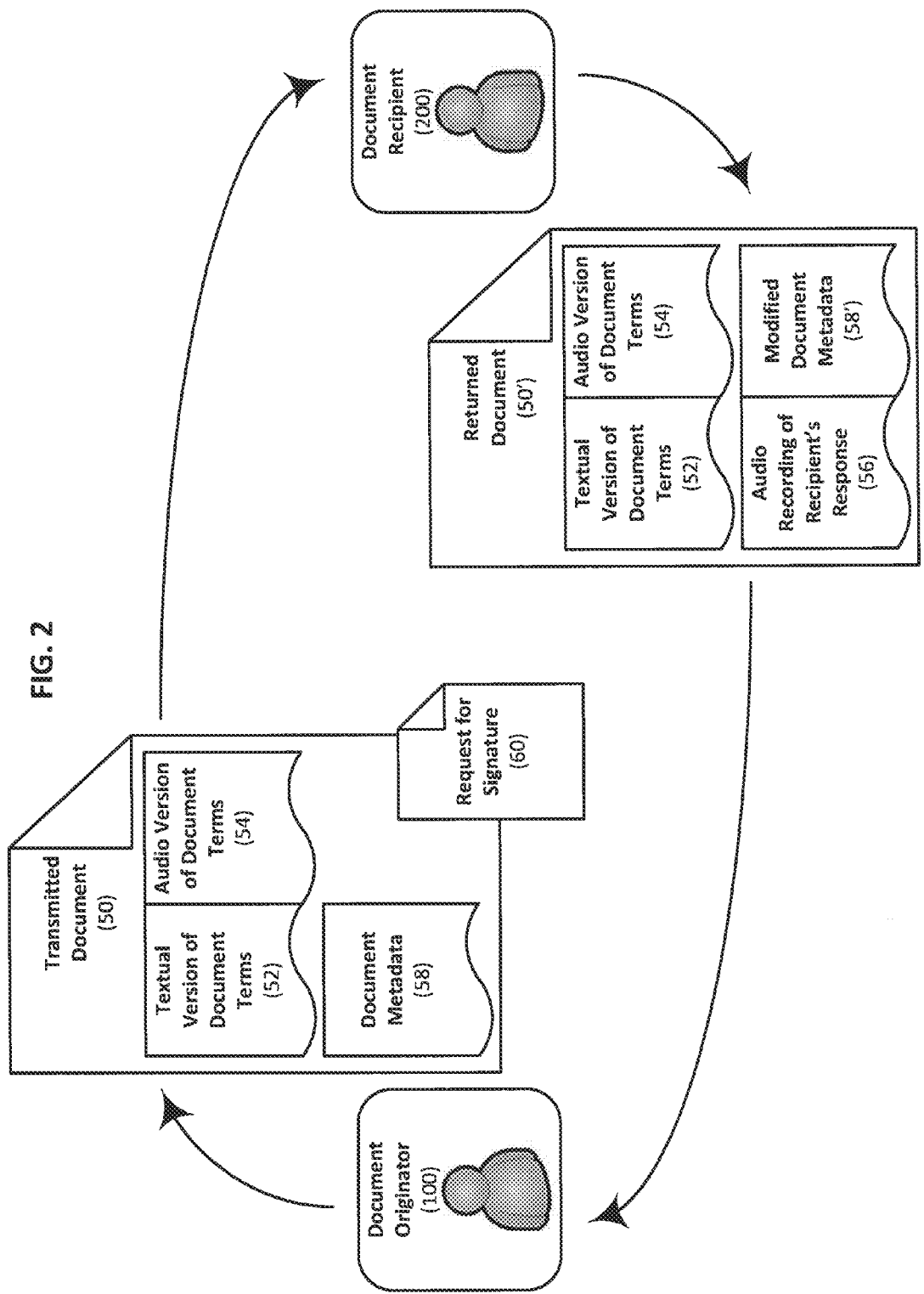
FIG. 2 is a data flow diagram schematically illustrating selected components of a document that is exchanged between a document originator and a document recipient in accordance with an embodiment of the present invention.

FIG. 2 is a data flow diagram schematically illustrating selected components of a document that is exchanged between a document originator and a document recipient. Specifically, FIG. 2 illustrates that a transmitted document 50 is sent from document originator 100 to document recipient 200. Transmitted document 50 includes a textual version 52 as well as an audio version 54 of the document terms. As disclosed herein, audio version 54 may comprise a reading of the document terms produced by document originator 100, or may comprise an automatically generated recording produced by text-to-speech module 610. Transmitted document 50 optionally includes metadata 58, which may include information that (a) defines a particular workflow associated with document 50, and/or (b) defines a particular status of document 50, such as "signed" or "unsigned". Transmitted document 50 is associated with a request for signature 60, which is also sent to document recipient 200. Request for signature 60 optionally includes execution instructions specifically generated for document recipient 200. In certain embodiments interactivity module 350 can be configured to audibly relay such execution instructions to document recipient 200. Although not illustrated in FIG. 2, transmitted document 50 may be routed to document recipient 200 via electronic signature server 300.

Still referring to FIG. 2, after document recipient 200 receives transmitted document 50, a returned document 50' is generated. Returned document 50' includes textual version 52, and optionally audio recording 54 of the document terms. Returned document 50' optionally includes an audio recording of the recipients' response 56. Recipient's response 56 may comprise an electronic signature where recipient 200 has assented to the document terms, but may alternatively include other comments where no such assent has occurred. In some embodiments, where recipient neither signs nor comments on the transmitted document 50, response 56 may be omitted. However, in such cases modified document metadata 58' may indicate that returned document 50' was provided to document recipient 200, but was left unsigned. Likewise, where document recipient 200 provides an electronic signature, modified document metadata 58' may indicate this status. As illustrated in FIG. 2, returned document 50' may be routed back to document originator 100 in certain embodiments, for example to allow originator 100 to review the recipient's response 56. However in other embodiments returned document 50' may be further processed by electronic signature server 300 according to an established workflow process.

Alternative Implementations

Figure 3A:
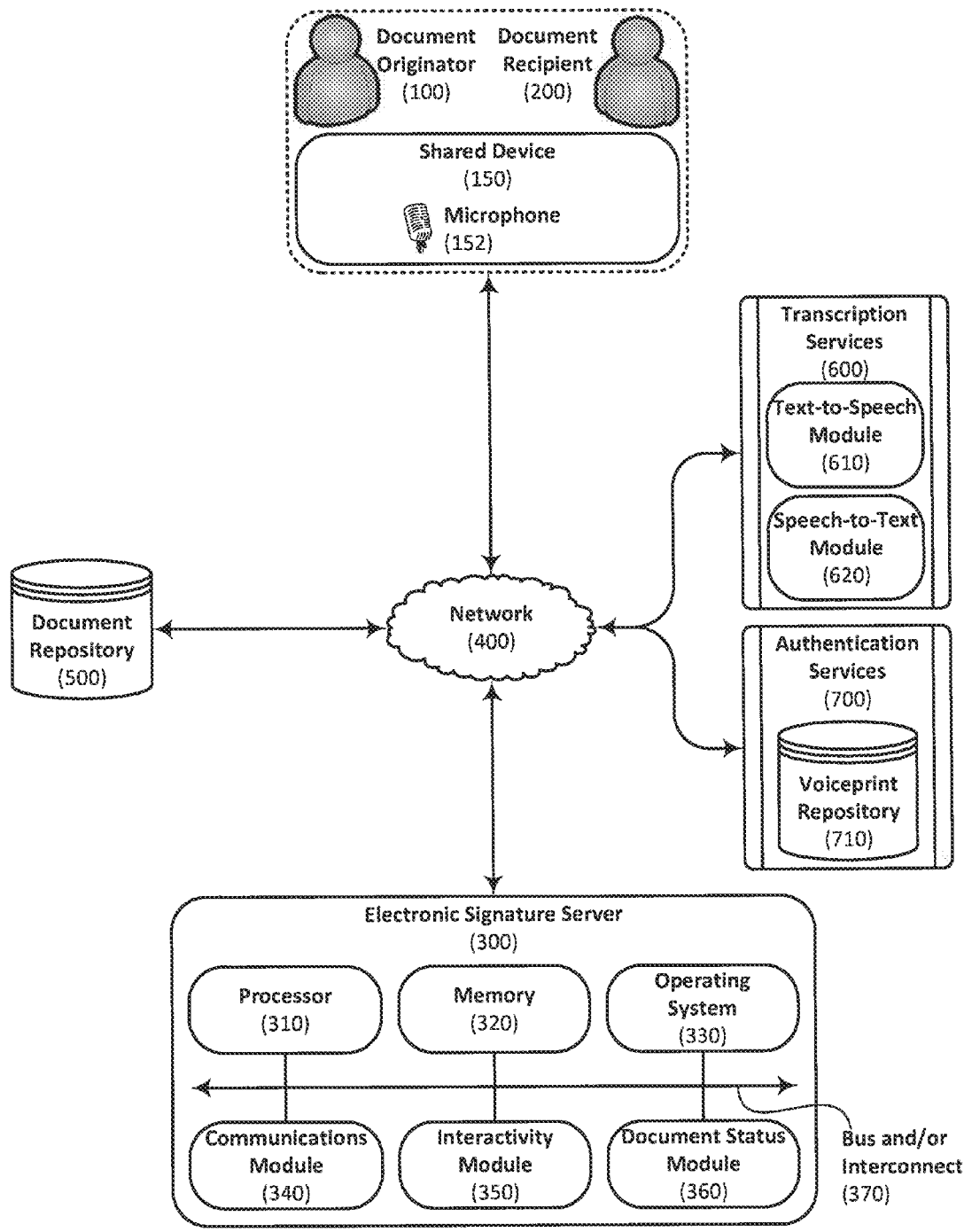
FIG. 3A is a block diagram illustrating selected components of a system that allows users of a shared device to record an agreed-upon document in accordance with an embodiment of the present invention.

While the example embodiments illustrated in FIGS. 1A and 1B and described above represent one set of implementations, it will be appreciated that a wide variety of alternative embodiments may be implemented as well. For example, FIG. 3A is a block diagram illustrating selected components of a system that allows users of a shared device to record an agreed-upon document. In particular, FIG. 3A illustrates that document originator 100 and document recipient 200 can use a shared device 150 having a microphone 152 to record both the document terms and the recipient's response to such terms. The recipient's response may comprise an electronic signature, such as an audio recording of recipient 200 saying, for example, "I agree to the foregoing terms.". It will be appreciated that in certain embodiments originator 100 and recipient 200 may be physically present together at the same shared device, such as when the two parties have their voice recorded by, for example, a smartphone that is connected to electronic signature server 300. However in other embodiments originator 100 and recipient 200 may be physically separated, but may nevertheless be connected with each other, and with electronic signature server 300, via a PSTN for example. In this case electronic signature server 300 can still be configured to record both the document terms as read by originator 100 and the response as spoken by recipient 200. In this case shared device 150 comprises two or more devices (such as two telephones) connected by a network (such as a PSTN).

FIG. 3B is a flowchart illustrating a method 20 for recording an agreed-upon document by users of a shared device. Method 20 commences with recording the document originator's reading of the document terms (see reference numeral 20a in FIG. 3B) and recording the document recipient's response to such terms (see reference numeral 20b in FIG. 3B). This can be accomplished using microphone 152 of shared device 150, which may comprise a single device shared by two parties who are physically located together, or which may comprise two or more devices connected by a network. Speech-to-text module 620 can be used to generate a transcript of the document terms and the recipient's response (see reference numeral 20c in FIG. 3B). Document repository 500 may be updated depending on the nature of the recipient's response (see reference numeral 20d in FIG. 3B). For example, where recipient 200 provides an electronic signature, the signature can be applied to the document and the signed version of the document can be archived in document repository 500. In an alternative embodiment the signature may be stored separately from the document, but the document as stored in repository 500 may still be modified to include a link to the electronic signature. Document status module 360 may also optionally update a corresponding document status database to indicate that the status of the particular document is "signed". Thus it will be appreciated that, in general, a wide range of supplemental processing can be invoked based on the document recipient's response (see reference numeral 20e in FIG. 3B). For example, in certain embodiments electronic signature server 300 can be configured to send email notifications containing copies of and/or links to a document and the corresponding electronic signature to particular users.

Figure 4A:
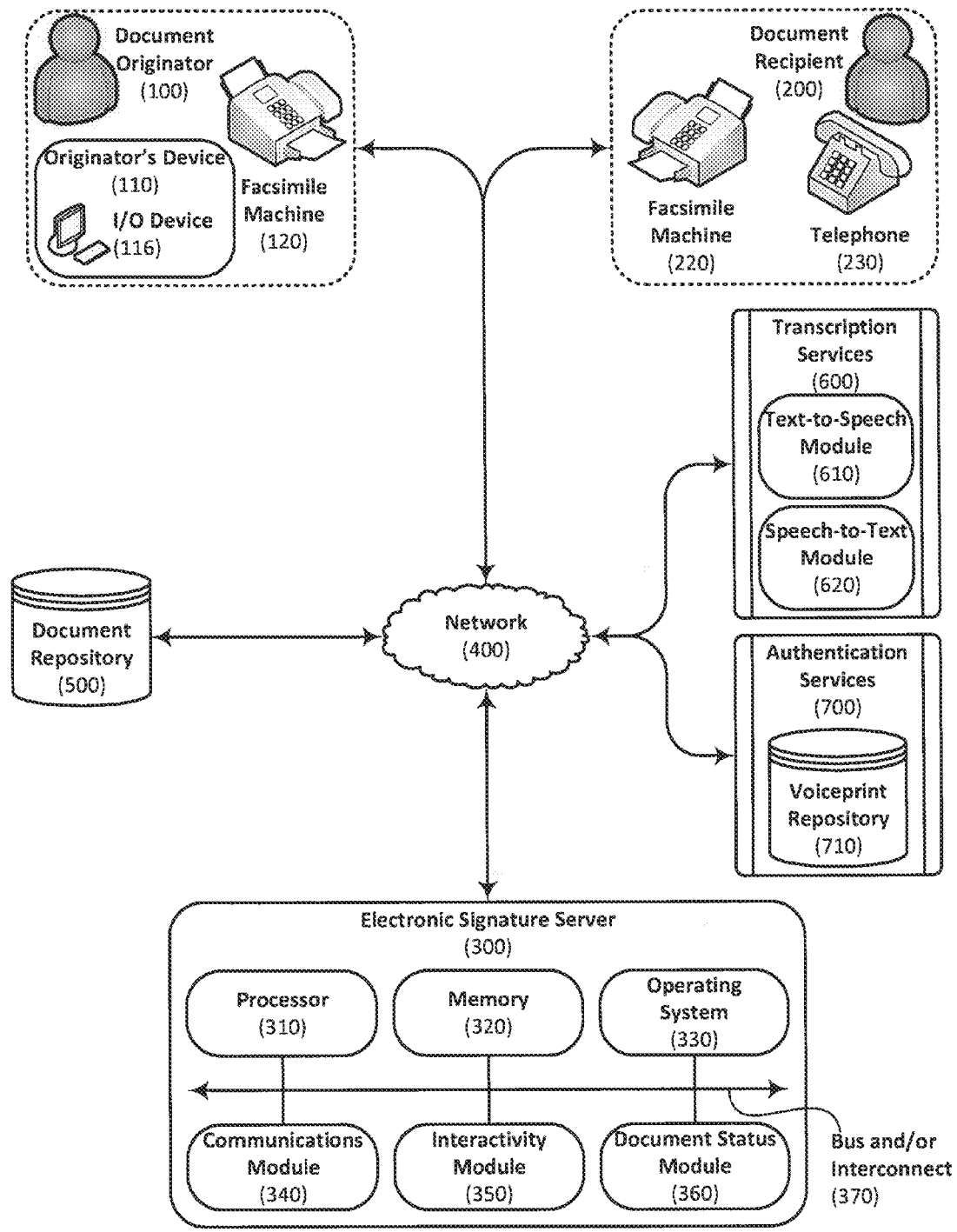
FIG. 4A is a block diagram illustrating selected components of a system that allows a document recipient to interact with and respond to a document aurally and/or orally using a telephone, in accordance with an embodiment of the present invention.

FIG. 4A is a block diagram illustrating selected components of a system that allows a document recipient to interact with and respond to a document aurally and/or orally using a telephone. In particular, FIG. 4A illustrates that document originator 100 has access to functionality associated with a facsimile machine 120. Such functionality may be provided by a dedicated facsimile machine, or may be provided via components associated with input/output device 116, such as by a fax modem included within a personal computer. Such functionality enables document originator 120 to send a document to recipient 200 using the facsimile machine. This advantageously allows originator 100 to provide recipient 200 with a document even where recipient only has access to conventional devices such as a facsimile machine 220 and/or a telephone 230. In particular, in such a configuration recipient 200 may still receive the document even though recipient does not have access to a computer that is capable of connecting to electronic signature server 300.

FIG. 4B is a flowchart illustrating a method 30 for providing a document recipient with an audio recording of a document that can be interacted with and responded to orally using a telephone. Method 30 commences with document recipient 200 receiving a document via facsimile machine 220 (see reference numeral 30a in FIG. 4B). Upon receiving the document, recipient 200 may connect to electronic signature server 300 using a conventional telephone (see reference numeral 30b in FIG. 4B) and identify the received document (see reference numeral 30c in FIG. 4B). The received document may be identified by, for example, a document identification number included with the document, such as on a fax coversheet. For instance, in one embodiment a fax coversheet accompanying the faxed document may include instructions for the recipient to call a particular telephone number that will cause a connection to be established with electronic signature server 300. Upon connection, electronic signature server 300 will prompt the document recipient 200 to identify the received document using a document identification number.

It will be appreciated that in alternative embodiments document recipient 200 can be provided with the audio recording of the document without using facsimile machine 220. In such alternative embodiments, electronic signature server 300 can be configured to call a voice telephone number associated with document recipient 200 and interact with document recipient 200 using voice prompts and spoken commands. Such interaction could include a reading of the document terms. Likewise in certain alternative embodiments interactions between document originator 100 and electronic signature server 300 may take the form of voice prompts and spoken commands.

Once electronic signature server 300 has identified the received document, a determination can be made with respect to whether that document includes or is otherwise associated with audio recordings in multiple languages (see reference numeral 30d in FIG. 4B). Where audio recordings in multiple languages are available, document recipient 200 can be prompted for a language selection (see reference numeral 30d' in FIG. 4B). Such prompting can be managed by interactivity module 350. Once an appropriate audio recording has been identified, document recipient 200 can then listen to the audio recording (see reference numeral 30e in FIG. 4B). In particular, the audio recording can be streamed to the recipient's telephone 230 across a PSTN. In addition to providing the audio recording, interactivity module 350 can be configured to provide recipient 200 with instructions for responding to the request for electronic signature (see reference numeral 30f in FIG. 4B). As disclosed herein, such instructions can be provided using voice prompts, and may optionally be responsive to spoken commands provided by document recipient 200.

After listening to the audio recording, or being provided with the opportunity to listen to the audio recording, document recipient 200 can record an appropriate response using telephone 230 (see reference numeral 30g in FIG. 4B). Document repository 500 may be updated depending on the nature of the recipient's response (see reference numeral 30h in FIG. 4B). For example, where recipient 200 provides an electronic signature, the signature can be applied to the document and the signed version of the document can be archived in document repository 500. Document status module 360 may also optionally update a corresponding document status database to indicate that the status of the particular document is "signed". Thus it will be appreciated that, in general, a wide range of supplemental processing can be invoked based on exactly how document recipient 200 responds to the request for an electronic signature (see reference numeral 30i in FIG. 4B). Such embodiments advantageously allow recipient 200 to interact with and electronically sign a document even where recipient 200 only has access to conventional devices such as facsimile machine 220 and/or a telephone 230.

CONCLUSION

Numerous variations and configurations will be apparent in light of this disclosure. For instance one example embodiment of the present invention provides. In some cases a computer-implemented document processing method comprises receiving, from a document originator, metadata that identifies a document. The document includes a plurality of document terms and is to be distributed to a document recipient as part of a workflow. The method further comprises saving, in a document repository, an audio recording corresponding to at least a portion of the document terms that are included within the document. The method further comprises sending, to the document recipient in response to a received request, at least a portion of the audio recording. The method further comprises prompting the document recipient with an audible request to provide a spoken response to at least one of the document and the audio recording. The method further comprises receiving, from the document recipient, the spoken response. The method further comprises saving the spoken response such that it is correlated with the document. In some cases the spoken response comprises a phrase indicating that the document recipient has assented to the document terms. In some cases the method further comprises (a) comparing a voiceprint of the spoken response with a voiceprint of an authorized document signer; and (b) the spoken response is correlated with the document only if the voiceprint of the spoken response substantially matches the voiceprint of the authorized document signer. In some cases the method further comprises sending a notification based on the spoken response. In some cases the spoken response comprises a phrase indicating that the document recipient has assented to the document terms. In some cases the audible request to provide the spoken response is sent to the document recipient after the audio recording is sent to the document recipient. In some cases the at least a portion of the audio recording is sent to the document recipient via a public switched telephone network. In some cases the document is saved in the document repository such that the document is logically associated with the audio recording. In some cases the audio recording comprises a reading of at least a portion of the document terms by the document originator. In some cases the method further comprises (a) receiving the document from the document originator; and (b) submitting the document to a text-to-speech module configured to generate the audio recording based on the document. In some cases sending at least a portion of the audio recording to the document recipient comprises providing an audio stream of the audio recording to a player provided by the document recipient.

Another example embodiment of the present invention provides an electronic signature system that comprises a document repository storing a document comprising a plurality of document terms. The document repository also stores an audio recording corresponding to at least a portion of the document terms. The document repository also stores metadata indicating a status of the document with respect to a workflow. The system further comprises an interactivity module configured to send, to a document recipient in response to a received request, at least a portion of the audio recording and an audible request to provide a spoken response to the audio recording. The interactivity module is further configured to receive the spoken response from the document recipient. The system further comprises a document status module configured to modify the metadata stored in the document repository based on the spoken response received from the document recipient. In some cases the system further comprises a transcription services module configured to generate the audio recording based on text-to-speech processing of the document. In some cases (a) the spoken response comprises an electronic signature indicating that the document recipient has assented to the document terms; and (b) the metadata is modified to indicate that the document recipient has assented to the document terms. In some cases the system further comprises a transcription services module configured to generate a transcript of the spoken response. The transcript of the spoken response is stored in the document repository and includes a logical association to the document. In some cases the system further comprises an authentication services module configured to compare a voiceprint of the spoken response with a voiceprint of an authorized document signer. The metadata is modified only if the voiceprint of the spoken response substantially matches the voiceprint of the authorized document signer. In some cases the document repository comprises a networked storage resource provided remotely with respect to the interactivity module and the document status module.

Another example embodiment of the present invention provides a computer program product encoded with instructions that, when executed by one or more processors, causes a document workflow process to be carried out. The process comprises receiving, from a document originator, metadata that identifies a document. The document includes a plurality of document terms and is to be distributed to a document recipient as part of a workflow. The process further comprises saving, in a document repository, an audio recording corresponding to at least a portion of the document terms that are included within the document. The process further comprises sending, to the document recipient in response to a received request, at least a portion of the audio recording. The process further comprises prompting the document recipient with an audible request to provide an audible response to at least one of the document and the audio recording. The process further comprises receiving, from the document recipient, the audible response. The process further comprises saving the audible response such that it is correlated with the document. In some cases receiving the audible response comprises receiving a prerecorded response from the document recipient. In some cases (a) the audible response comprises a phrase indicating that the document recipient has assented to the document terms; (b) the document workflow process further comprises comparing a voiceprint of the audible response with a voiceprint of an authorized document signer; and (c) the audible response is correlated with the document only if the voiceprint of the audible response substantially matches the voiceprint of the authorized document signer. In some cases the audible response comprises touch-tones generated by a telephone.

The foregoing description of the embodiments of the present invention has been presented for the purposes of illustration and description. It is not intended to be exhaustive or to limit the invention to the particular disclosed embodiments. Many modifications and variations are possible in light of this disclosure. Thus it is intended that the scope of the invention be limited not by this detailed description, but rather by the claims appended hereto.

What is claimed is:

1. A computer-implemented document processing method comprising:

saving, in a document repository administered by an electronic signature server, a document received from a document originator, wherein the document includes a plurality of document terms and metadata that defines an electronic signature workflow that calls for the document to be distributed to a document recipient;

saving, in the document repository, an audio recording of at least a portion of the document terms that are included within the document;

establishing a communication session between the electronic signature server and the document recipient, wherein the communication session enables two-way audio communication between the electronic signature server and the document recipient;

sending, from the electronic signature server to the document recipient, via the communication session, the audio recording of at least the portion of the document terms;

sending, from the electronic signature server to the document recipient, via the communication session, a request for a spoken assent to the document terms included in the document;

prompting the document recipient with an audible request to provide the spoken assent to the document terms included in the document;

receiving, by the electronic signature server from the document recipient via the communication session, the spoken assent to the document terms included in the document via the same communication session;

saving the spoken assent in the document repository;

updating the metadata to establish a logical connection between the document and the spoken assent that is saved in the document repository; and sending, to the document originator, at least one of (a) a modified version of the document that is annotated with an indication of the spoken assent, and (b) the spoken assent.

2. The method of claim 1, wherein:

the spoken assent comprises a phrase indicating that the document recipient has assented to the document terms included in the document;

the method further comprises authenticating a voiceprint of the spoken assent based on a voiceprint of an authorized document signer; and the metadata is updated in response to authenticating the voiceprint of the spoken assent.

3. The method of claim 1, wherein at least one of the modified version of the document and the spoken assent are sent to the document originator via electronic mail.

4. The method of claim 1, wherein the spoken assent comprises a phrase indicating that the document recipient has assented to the document terms that are included within the document.

5. The method of claim 1, wherein the audible request to provide the spoken assent is sent to the document recipient after the audio recording is sent to the document recipient.

6. The method of claim 1, wherein the request for the spoken assent is sent to the document recipient via a public switched telephone network, and wherein the spoken assent is received from the document recipient via the public switched telephone network.

7. The method of claim 1, further comprising logically associating the document with the audio recording in the document repository.

8. The method of claim 1, wherein the audio recording comprises a reading of the portion of the document terms by the document originator.

9. The method of claim 1, further comprising submitting the document to a text-to-speech module configured to generate the audio recording.

10. The method of claim 1, wherein sending the audio recording to the document recipient comprises providing an audio stream of the audio recording to a player provided by the document recipient.

11. An electronic signature system comprising:
a document repository storing (a) a document comprising a plurality of document terms, (b) an audio recording corresponding to at least a portion of the document terms, and (c) metadata that defines an electronic signature status of the document;
a memory device; and
a processor that is operatively coupled to the memory device, wherein the processor is configured to execute instructions stored in the memory device that, when executed, cause the processor to carry out an electronic signature process, the process comprising:
receiving, from a document originator, instructions to invoke an electronic signature workflow that calls for the document to be distributed to a document recipient,
establishing a communication session between the electronic signature system and the document recipient, wherein the communication session enables two-way audio communication between the electronic signature system and the document recipient,
sending, from the electronic signature system to the document recipient, via the communication session, the audio recording corresponding to at least the portion of the document terms,
sending, to the document recipient, via the communication session, a request for a spoken assent to the document terms associated with the audio recording,
prompting the document recipient with an audible request to provide the spoken assent,
receiving, by the electronic signature system, the spoken assent from the document recipient, wherein the spoken assent is received via the communication session,
comparing a voiceprint of the spoken assent with a voiceprint of an authorized document signer,
saving the spoken assent in the document repository,
modifying the metadata to establish a logical connection between the document and the spoken assent that is saved in the document repository, wherein the metadata is modified only if the voiceprint of the spoken assent substantially matches the voiceprint of the authorized document signer, and
sending, to the document originator, at least one of (a) a modified version of the document that is annotated with an indication of the spoken assent, and (b) the spoken assent.

12. The electronic signature system of claim 11, wherein the electronic signature process further comprises generating the audio recording based on text-to-speech processing of the document.

13. The electronic signature system of claim 11, wherein:
the spoken assent comprises a phrase indicating that the document recipient has assented to at least the portion of the document terms recorded in the audio recording; and
the metadata is modified to indicate that the document recipient has assented to at least the portion of the document terms recorded in the audio recording.

14. The electronic signature system of claim 11, wherein the electronic signature process further comprises generating a transcript of the spoken assent, wherein the transcript of the spoken assent is stored in the document repository and includes a logical association to the document.

15. The electronic signature system of claim 11, wherein the document repository comprises a networked storage resource provided remotely with respect to the processor and the memory device.

16. A non-transitory computer readable medium encoded with instructions that, when executed by one or more processors, causes a document workflow process to be carried out, the process comprising:
saving, in a document repository administered by an electronic signature server, a document received from a document originator, wherein the document includes a plurality of document terms and metadata that defines an electronic signature status for the document;
saving, in the document repository, an audio recording of at least a portion of the document terms that are included within the document;
establishing a communication session between the electronic signature server and a document recipient, wherein the communication session enables two-way communication between the electronic signature server and the document recipient;
sending, form the electronic signature server to the document recipient, via the communication session, the audio recording of at least the portion of the document terms;
sending, from the electronic signature server to the document recipient, via the communication session, a request for an audible assent to the document terms in the audio recording;
prompting the document recipient with an audible request to provide the audible assent to the document terms sent to the document recipient;
receiving, by the electronic signature server from the document recipient via the communication session, the audible assent to the document terms in the audio recording;
saving the audible assent in the document repository;
updating the metadata to establish a logical connection between the document and the audible assent that is saved in the document repository; and
sending, to the document originator, at least one of (a) a modified version of the document that is annotated with an indication of the audible assent, and (b) the audible assent.

17. The computer program product of claim 16, wherein receiving the audible assent comprises receiving a prerecorded response from the document recipient.

18. The computer program product of claim 16, wherein:
the audible assent comprises a phrase indicating that the document recipient has assented to the document terms included in the audio recording;
the document workflow process further comprises authenticating a voiceprint of the audible assent based on a voiceprint of an authorized document signer; and
the metadata is updated in response to authenticating the voiceprint of the audible assent.

19. The computer program product of claim 16, wherein the audible assent comprises touch-tones generated by a telephone.

20. The computer program product of claim 16, wherein the request for the audible assent is sent to the document recipient via a phone call, and wherein the audible assent is received from the document recipient via the phone call.

\* \* \* \* \*